Figure 1:
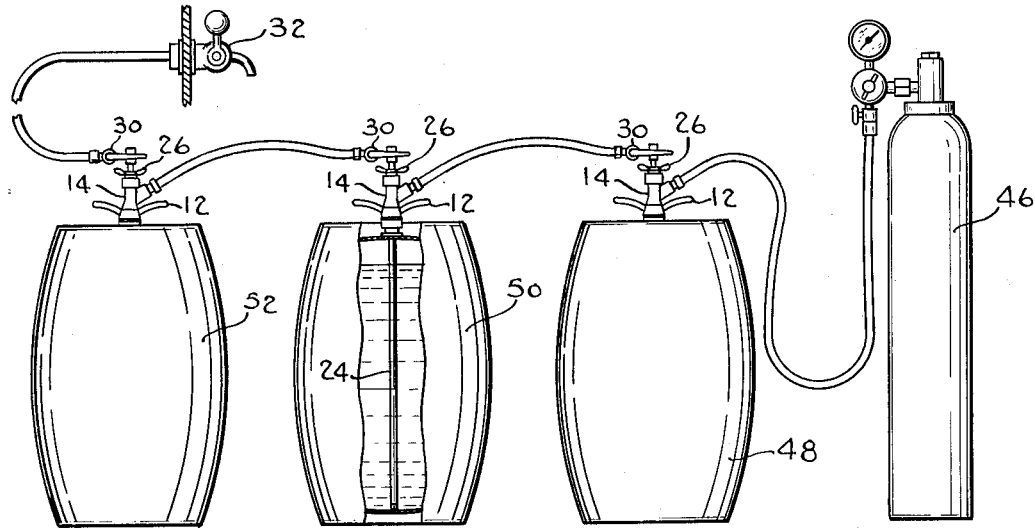

Jan. 17, 1956  C. L. DAUN  2,731,027
BEER DISPENSING APPARATUS
Filed March 19, 1951

INVENTOR.
CARL L. DAUN
BY
John W. Michael
ATTORNEY

United States Patent Office 2,731,027
Patented Jan. 17, 1956

2,731,027

BEER DISPENSING APPARATUS

Carl L. Daun, Milwaukee, Wis., assignor to Research & Engineering Corporation, Milwaukee, Wis., a corporation of Wisconsin Application March 19, 1951, Serial No. 216,378

4 Claims. (Cl. 137—170.1)

This invention relates to apparatus for dispensing beverages. More particularly this invention relates to apparatus for dispensing carbonated beverages without thereby changing the gas content of the beverage while eliminating the losses customarily encountered in dispensing such beverages.

This apparatus is particularly useful in dispensing beer from barrels but is, as will be apparent, suitable for all liquids. According to present practice barrel beer is dispensed from a faucet connected to a tap rod projecting to the bottom of the barrel through a tap which serves to provide a fluid tight seal at the tapping hole. Beer is forced up the tap rod to the faucet by the gas pressure in the barrel. A pressure regulated gas (air or carbon dioxide) source is connected to the interior of the barrel through a gas check valve in the tap. Theoretically such a system will maintain the carbon dioxide gas content of the beer constant and the drawing should be uniform. In practice, however, various losses attributable to variations in the gas content caused by temperature and pressure deviations from the ideal are encountered to a greater or lesser extent.

When a barrel is tapped it frequently happens that the beer is "wild" and the consequent excessive foaming which takes place when such beer is drawn from the barrel represents a loss. Unless temperature and pressure conditions are ideal, as the beer level approaches the bottom of a barrel a "blowing loss" is encountered in the form of either "wild" beer or "flat" beer. Under ordinary circumstances only one barrel of beer is tapped at a time and when the barrel is emptied another must be tapped, often resulting in inconvenience and lost time. Since taverns frequently tap several barrels a day, it is highly desirable to increase the capacity "back of the faucet" by connecting a plurality of barrels to a faucet.

Wild beer is caused by excess absorption of $CO_2$ gas or maintenance of too low a temperature in relation to the pressure maintained on the beer. Flat beer is caused by absorption of air (where air is used to maintain the pressure on the beer) or maintenance of too high a temperature in relation to the pressure.

An object of this invention is to provide apparatus for connecting a plurality of beer barrels in series to one faucet to increase the capacity.

Another object is to provide beer dispensing apparatus which will eliminate losses due to tapping and blowing.

A further object is to provide beer dispensing apparatus which holds the quality of the beer constant and permits uniform drawing.

In order to increase the capacity "back of the faucet" I connect the barrels in series so the most remote barrel is the first to empty and a volume of beer equal to that drawn at the faucet is transferred from each barrel to the next preceding barrel as beer is drawn. When effecting these transfers it is essential to avoid separation of the carbon dioxide originally bound in solution in the beer in the course of its manufacture, in order to retain the original character of the beer. I will hereafter, for brevity, refer to such separation as "breaking." Another requisite to success is that the apparatus must permit maintenance of uniform pressure on the beer. Finally, the apparatus must be simple.

I designed a beer tap which provides for beer flow into the barrel from the barrel next most remote from the faucet. As drawn through a conventional tap, beer flows from the barrel through a tap rod. In providing for the flow of beer or gas into a barrel from another barrel through a tap while withdrawing beer from the tap rod, it will be appreciated that my tap operates in a totally new manner. My tap, during the transfer of beer from one series-connected barrel into another, avoids all breaking of the beer and does not by reason of such transfers affect the character of the beer.

Figure 2:
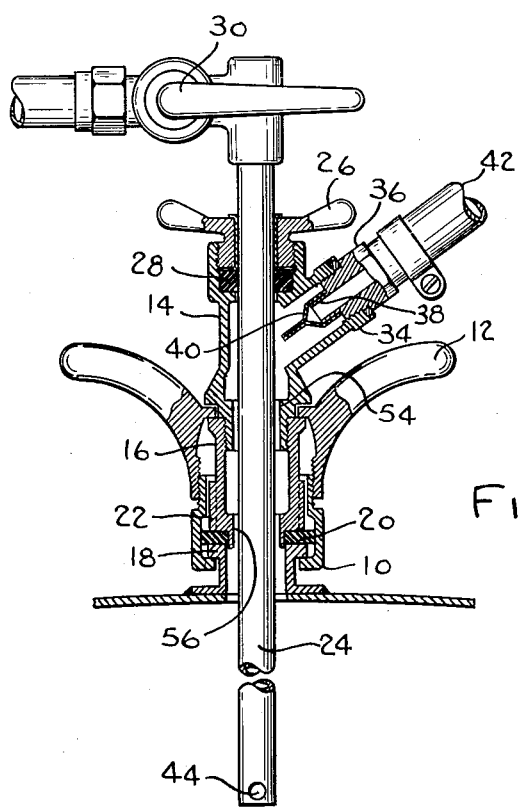

Other objects and advantages will be pointed out in, or be apparent from, the specification and claims, as will obvious modifications of the single embodiment shown in the drawings, in which:

Fig. 1 illustrates the present apparatus employed in connecting three barrels of beer in series for dispensing from a single faucet; and Fig. 2 is a sectional view of one of the taps.

The present tap is provided with the conventional bayonet type coupler 10 threadably connected to winged member 12 rotatably supported on body 14 by means of sleeve 16 threaded to the lower end of the body. Member 12 may be turned to lower the coupler 10 to permit engagement with the mating coupler 18 at the tapping hole. To connect the tap to the barrel the winged member must be turned in the usual manner to draw tap coupler 10 up tight against the underside of the barrel coupler 18 to seal the barrel coupler against the rubber annulus 20 carried by the tap between sleeve 16 and coupler 10. It will be noted that coupler 10 is keyed at 22 to the sleeve in the usual manner to prevent rotation of the coupler. When the tap has been secured to the barrel, tap rod 24 may be inserted in the central aperture of the tap to drive the cork out of the tapping hole. As soon as the tap rod has been pushed to the bottom of the barrel, as shown in Fig. 1, wing nut 26 is turned on its threads to deform rubber gasket 28 against the tap rod to seal the barrel and prevent loss of pressure or beer. Plug valve 30 at the top of the tap rod is closed during the time the barrel is being tapped.

According to usual practice the tap rod would be coupled to faucet 32 and transverse conduit 34 communicating with the central aperture in the tap below rod seal 28 would be connected to a pressure regulated source of gas pressure which would force the beer up the tap rod through holes 44. In the present valve a centrally apertured plug 36 is threaded into the end of conduit 34 and is provided with a nipple 38 projecting downstream to mount a tubular rubber check valve 40, the outer or free end of which is flattened. This check valve opens when the pressure in hose 42 is greater than the pressure within the tap to permit flow into the tap exteriorly of the tap rod. Contrary to the usual practice, hose 42 is connected to the tap rod of the barrel next most remote from the faucet to deliver beer or gas from such barrel to the next preceding barrel. The present check valve avoids breaking the beer as it passes through the valve because the valve opens with a slight pressure differential and is sufficiently resilient to avoid any appreciable constricting effect. I have found that properly selected gum rubber tubing lends itself to this function. So far as my experiments indicate this is the only check valve which can pass beer without breaking the beer, but there may be other satisfactory valves not known to me at this time. Those familiar with this art will realize that a rubber check valve, known as a Thomas valve, has heretofore been employed in the location of the present valve to serve as a gas check valve, but the Thomas valve is useless for the present function since it breaks the beer.

Referring now to Fig. 1, it will be noted that the carbon dioxide cylinder 46 is connected to conduit 34 in barrel 48 in much the same manner as in the present practice. The tap rod in barrel 48, however, is connected to the tap conduit 34 of the tap mounted in barrel 50 and the tap rod in barrel 50 is similarly connected to the tap in barrel 52. The tap rod in barrel 52 is connected to the faucet 32 at the bar or other place. Thus the beer flowing out of the tap rod in barrel 48 does not flow directly to the faucet but flows into barrel 50 through the tap.

Referring back to Fig. 2, it will be noted that restricting shoulder or collar 54 at the lower end of body 14 and another restricting collar 56 at the lower end of sleeve 16 provide more clearance than necessary to receive the tap rod. These collars ordinarily are of such diameter as to receive the tap rod 24 with just enough clearance to allow gas flow into the barrel from the usual Thomas valve. In the present case, however, the clearance between the collars and the tap rod is materially increased to permit the beer to flow down into the barrel without breaking. If the usual clearance were employed, the beer flow past the restrictions would be turbulent and would cause breaking of the beer. The clearance between the tap rod and the collars has been experimentally selected to insure that the beer flow down into the barrel will be laminar. This laminar flow might be likened to a ring of liquid flowing down the outside of the tap rod 24. As noted above, if the clearance is too small the flow is turbulent. I have found there is a safe range of about ⅛ inch of difference between the rod and restriction diameters and if the upper limit is exceeded the incoming beer cascades to the level of the beer in the barrel and causes breaking. In this respect it appears the upper restriction 54 serves as a collector insuring that the beer flows down the exterior of the tap rod. When the flow is thus started adhesive forces apparently prevent the beer from falling from the rod and breaking. Since the beer check valve 40 does not affect the gas content of beer flowing through the valve, it is possible to transfer beer from one barrel to another without changing the gas content of the beer while maintaining the desired pressure to prevent the beer from going "flat."

It will be appreciated that beer may be dispensed from faucet 32 while drawing on the combined capacity of the barrels connected in the series. When connected as illustrated in Fig. 1 beer may be dispensed from faucet 32 which will draw directly from barrel 52. At the same time an equal quantity of beer will be transferred from barrel 50 to barrel 52 and a similar quantity will be transferred from barrel 48 to barrel 50. The reduction in pressure in barrel 48 due to the withdrawal of a given quantity of beer is compensated by gas flow into the barrel from the pressure regulated source of carbon dioxide 46. When barrel 48 is empty the gas flows into the barrel through the tap and out of the barrel through the tap rod. This permits the gas pressure to act on barrel 50 as this barrel empties. Similarly, when barrel 50 has been emptied the gas will flow out of its tap rod and into barrel 52 to maintain the pressure on the remaining beer. It will be seen that the check valve checks both beer and gas. Therefore, empty barrels at the end of the series can be replaced without interrupting the flow at the faucet.

With the barrels connected in series in the manner illustrated, the usual blowing losses encountered when a single barrel of beer is almost empty will not be encountered until the barrel connected to the faucet is within approximately 20 to 40 glasses of the empty mark. At such a time the blowing loss will occur unless the substantially empty barrel is removed and connected at the end of a new series of full barrels. Thus all blowing losses can be avoided. If another full barrel is added to the end of the series and is wild when tapped, it will return to conform in character to the beer being drawn from the preceding barrels before it is drawn and the tapping losses due to wild beer are eliminated. It will be appreciated that this apparatus is simple to handle in that no plug valve need be manipulated to effect any replacement of empty barrels inasmuch as the beer check valve 40 automatically closes when the hose connecting the particular tap to the source of beer or gas under pressure is disconnected.

As pointed out above, the present tap differs from the conventional tap in that the beer check valve replaces the usual gas check valve and the clearance between collars 54, 56 and the tap rod 24 is increased to allow laminar flow of the beer down the outside of tube 24 while preventing the beer from cascading and breaking when it reaches the liquid level in the barrel. These two changes make possible a series connection of beer barrels which greatly increases the effective capacity behind a particular faucet while eliminating many of the losses which are presently incurred in handling draft beer by means of a conventional tap. Furthermore, the series system greatly reduces the amount of work involved in handling draft beer. With the present system it is possible for a tavern operator to have a day's supply of beer "back of the faucet" instead of tapping a barrel several times a day, or a longer supply, depending on the rate of consumption. Not only is this a great convenience, but increased profits will result from the use of this apparatus by reason of the elimination of losses above referred to.

The few simple changes in the conventional tap thus permit transfer of beer into a barrel as well as out of the barrel. This completely different concept makes the series connection of barrels practical and advantageous. While the illustrated system is most desirable for economic reasons, I have devised another series system which employs a tap rod which differs from the usual rod. Further details of this system may be seen in my co-pending application Serial No. 216,379, filed March 19, 1951, now abandoned.

While I have illustrated but one modification of this invention, other forms will occur to those skilled in the art. For example, the check valve could readily be located on the downstream side of the plug valve in the tap rod without departing from the spirit of this invention. Such a change would not be desirable, however, since a plug or other type valve would then be required in conduit 34 to prevent loss of beer or pressure when tapping a barrel. Since this invention may take other forms, I do not wish to be limited by the illustrated modification but only by the scope of the claims.

I claim:

1. Apparatus for serially interconnecting a plurality of beer barrels to dispense the contents from a single faucet, comprising, a tap coupled to each barrel, a tap rod mounted in each tap and extending into the corresponding barrel through the aperture in the tap, a transverse conduit communicating with each tap aperture, a check valve in each conduit, conduit means connecting the tap rod of the first barrel to a faucet, conduit means connecting the transverse tap conduit of a second barrel to a fluid pressure source, conduit means connecting the transverse tap conduit of said first barrel to the tap rod of the second barrel so the pressure applied to the second barrel effects transfer of beer to the first barrel as beer flows from the first barrel to said faucet.

2. Apparatus according to claim 1 in which each tap includes a restriction below the transverse tap conduit, said restriction having a diameter greater than the tap rod to limit the flow of beer into the tap to laminar flow adhering to the exterior of the rod.

3. Apparatus according to claim 2 in which said check valve is a flattened rubber tube mounted on a nipple to open when subjected to a pressure differential.

4. In a vertically apertured barrel tap having a transverse conduit communicating with the aperture, a check valve in said conduit, said check valve being a flattened rubber tube mounted on a nipple and resilient enough to pass beer without breaking, and a restriction in the aperture below the conduit for defining an annular space between it and the tap rod, said space being sufficient to prevent turbulent flow of beer therethrough and small enough to cause the beer to flow down the outside of the tap rod by virtue of adhesion.

References Cited in the file of this patent

UNITED STATES PATENTS

| | | |
|---|---|---|
| 584,863 | Farnoff | June 22, 1897 |
| 587,987 | Mills | Aug. 10, 1897 |
| 879,604 | Wawrzinski | Feb. 18, 1908 |
| 2,018,543 | Buirk | Oct. 22, 1935 |
| 2,043,856 | Knapp | June 9, 1936 |
| 2,124,308 | Mezzapesa | July 19, 1938 |
| 2,186,723 | Harr et al. | Jan. 9, 1940 |
| 2,274,862 | Groeniger | Mar. 3, 1942 |
| 2,409,890 | Owens | Oct. 22, 1946 |
| 2,510,991 | Mazzeo | June 13, 1950 |